Oct. 31, 1939.   M. B. CAMERON   2,177,958
BRAKE MECHANISM
Original Filed Nov. 18, 1938   4 Sheets-Sheet 2
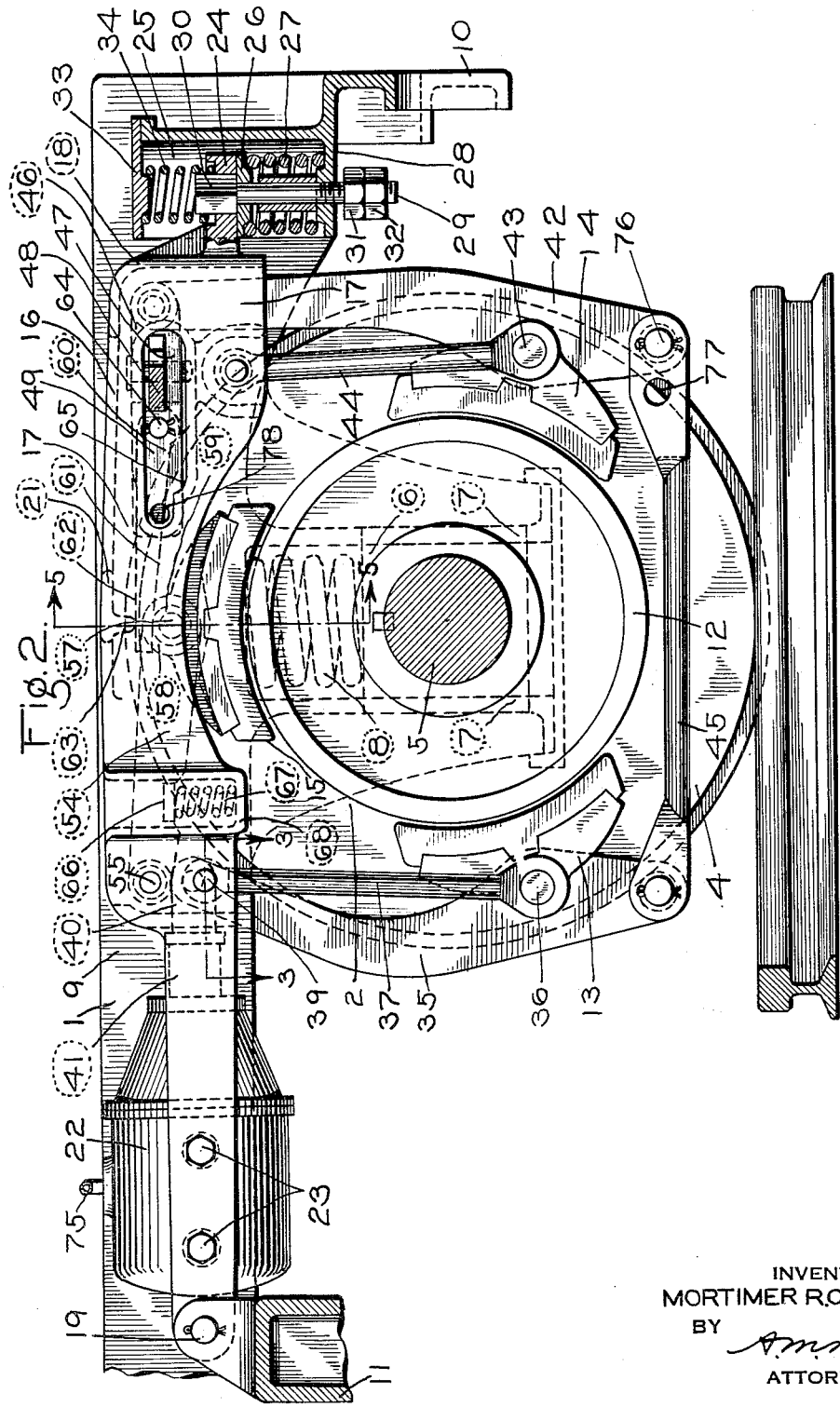
INVENTOR
MORTIMER R. CAMERON
BY
ATTORNEY Oct. 31, 1939.   M. B. CAMERON   2,177,958
BRAKE MECHANISM
Original Filed Nov. 18, 1938   4 Sheets-Sheet 3
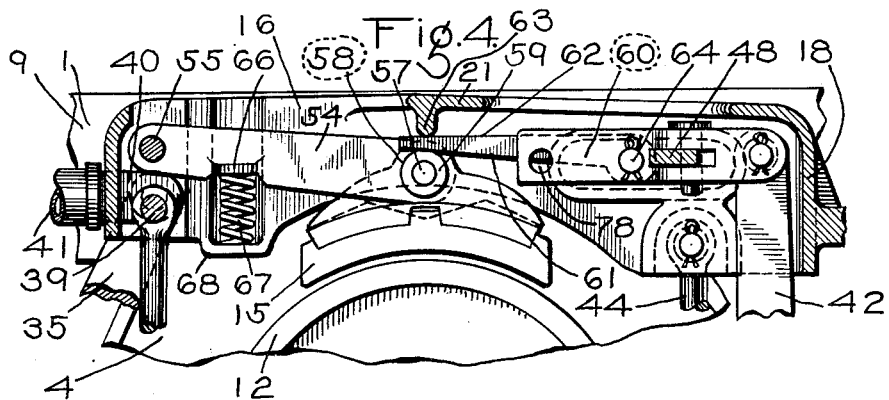
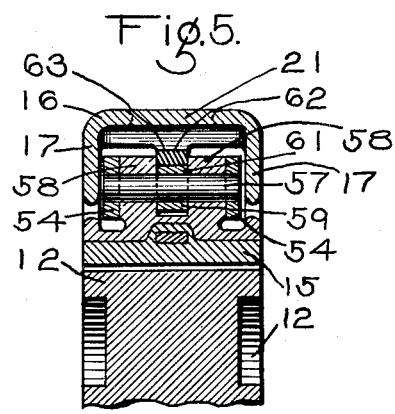
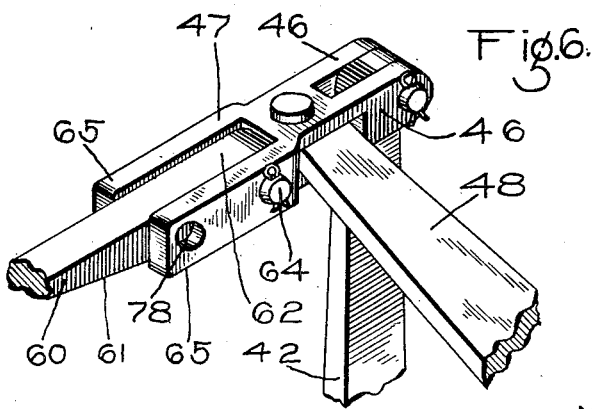
INVENTOR
MORTIMER R. CAMERON
BY
ATTORNEY

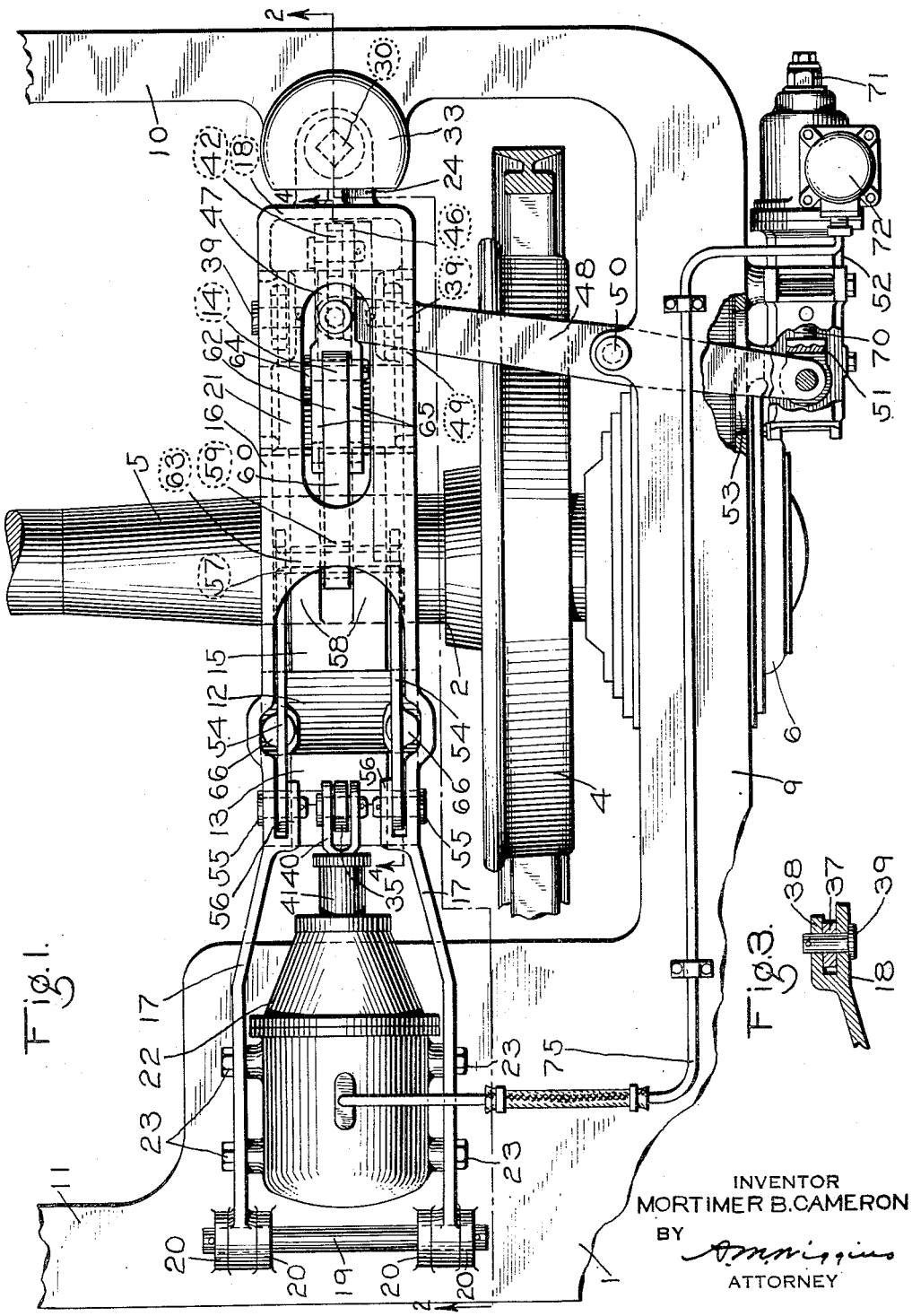

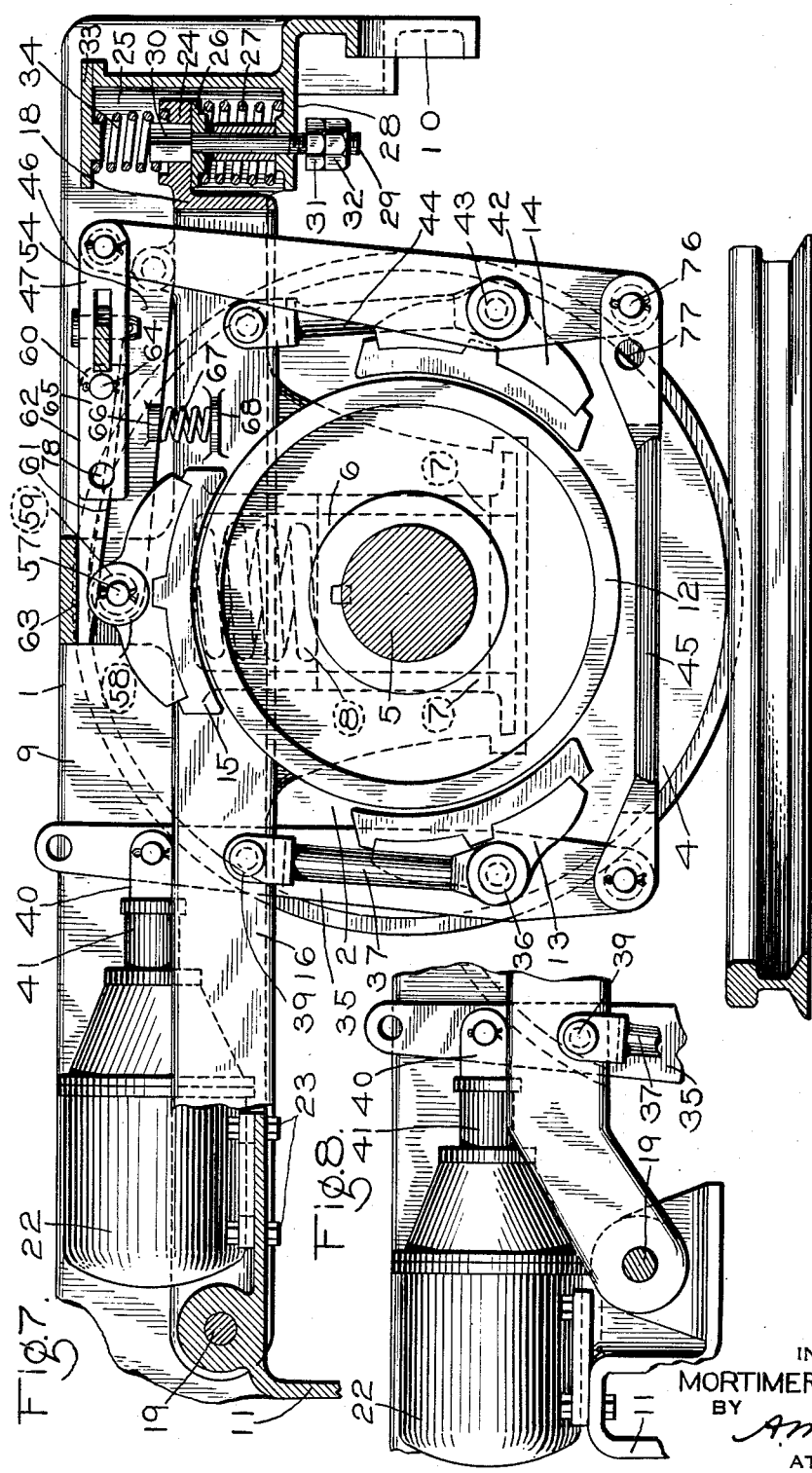

Patented Oct. 31, 1939

2,177,958

UNITED STATES PATENT OFFICE 2,177,958

BRAKE MECHANISM

Mortimer B. Cameron, Edgewood, Pa., assignor to The Westinghouse Air Brake Company, Wilmerding, Pa., a corporation of Pennsylvania Application November 18, 1938, Serial No. 241,100
Renewed June 24, 1939

35 Claims. (Cl. 188—58)

This invention relates to brake rigging for railway vehicle trucks and more particularly to that type of brake rigging disclosed in a prior pending application of Carlton D. Stewart, Serial No. 214,517, filed June 18, 1938, in which downwardly directed forces set up in the rigging when the brake shoes are in frictional braking engagement with the wheel and axle assembly will be transmitted to the assemblies instead of to the truck frame, and in which an additional brake shoe or shoes, as the case may be, are adapted to be moved into engagement with each assembly to transmit such force to the assembly and to assist in braking the assembly.

The brake rigging disclosed in the above mentioned pending application is of the clasp type and comprises a single brake cylinder and a single system of operatively connected levers and rods for actuating clasp arranged brake shoes into and out of braking engagement with a wheel and axle assembly of the truck, and further comprises a brake carrier member which normally supports the brake system from the truck frame, and which is actuated by said system when an application of the brakes is initiated to move another brake shoe into engagement with a wheel and axle assembly to assist in opposing rotation of the assembly and to support a greater portion of the load imposed on the system due to the frictional braking engagement of the clasp arranged brake shoes with the assembly.

An object of the present invention is to provide a novel brake arrangement of the above mentioned type.

Another object of the invention is to provide a brake rigging of the above mentioned type with means whereby all of the brake shoes may be simultaneously adjusted either automatically or manually to compensate for wear.

Other objects and advantages will appear in the following more detailed description of the invention.

In the accompanying drawings Fig. 1 is a fragmentary plan view of a railway vehicle truck embodying the invention;

Fig. 2 is a longitudinal sectional view of the same taken on the line 2—2 of Fig. 1, the brake carrier and the several parts of the brake rigging being shown in release position;

Fig. 3 is a fragmentary sectional view taken on the line 3—3 of Fig. 2 and illustrates the connection between one of the brake hangers and the brake carrier;

Fig. 4 is a fragmentary longitudinal sectional view taken on the line 4—4 of Fig. 1;

Fig. 5 is a fragmentary sectional view taken on the line 5—5 of Fig. 2;

Fig. 6 is a fragmentary perspective view of a portion of the brake rigging;

Fig. 7 is a sectional view similar to Fig. 2 but showing a modification of the connection between the truck frame and the brake carrier, a modification of the brake cylinder mounting and a modification of the slack adjusting means; and Fig. 8 is a fragmentary sectional view illustrating a further modification of the connection between the truck frame and the brake carrier and a modification of the brake cylinder mounting.

For illustrative purposes the invention is shown embodied in a railway vehicle truck of the type having a cast metal truck frame 1 and a plurality of longitudinally spaced wheel and axle assemblies 2, only a portion of the truck frame and a portion of one of the wheel and axle assemblies being shown. Each assembly may comprise laterally spaced wheels 4 which may be secured in any desired manner to the axle 5.

Each axle 5 is suitably journaled at each end in a journal bearing 6 loosely mounted between the spaced pedestal jaws 7 depending downwardly from the truck frame, and seated on the journal bearing, and resiliently supporting the truck frame is a spring 8.

The truck frame may be of the usual construction having spaced side frames 9 which are connected together at each end by a transversely extending end piece 10 and intermediate the ends by the usual spaced transversely extending transoms 11, only one of said end pieces and transoms being shown.

Secured to the axle adjacent each wheel is an annular brake drum 12 having an outer or peripheral braking surface which is adapted to be frictionally engaged by brake elements 13, 14 and 15, radially arranged about the drum, the greater portions of the elements 13 and 14 being located below the horizontal center line of the drum and at opposite sides of the drum, and the element 15 being located above the drum and centered on substantially the vertical center line of the drum. It will here be understood that each brake element may comprise the usual brake shoe and brake shoe head, but since this construction of head and shoe is well known, each element will, for simplification, be hereinafter referred to by the term brake shoe.

Located at the inner side of the wheel 4 and extending longitudinally of the truck frame and passing over the drum 12 is a combined lever and brake rigging supporting member 16 which, as best shown in Figs. 1, 2 and 5, is preferably in the form of a single casting having laterally spaced vertically disposed side pieces 17 which are connected together at one end by an end piece 18. At the opposite end of the member these side pieces are pivotally mounted on a transversely extending pin 19 which pin, at each of its ends, is mounted in a pair of spaced lugs 20 which extend upwardly from the transom 11 and which are preferably integral with the transom. Each side piece fits between a pair of the lugs 20 and these lugs serve to prevent lateral movement of the member relative to the truck frame. For a portion of their length these side pieces 17 are integrally connected together along their upper edges by a laterally extending web 21.

Adjacent the pivoted end of the member 16 there is interposed between the side pieces 18 a brake cylinder 22 which, as best shown in Fig. 1, is removably secured to the side pieces by means of short laterally extending bolts 23.

The opposite end of the member is provided with a lug 24 which extends outwardly from the end piece 18 into a pocket 25 formed in the end of the truck frame. This lug rests on a spring seat 26 carried by a spring 27 which is seated on the bottom wall 28 of pocket 25. Extending through a central circular opening in the spring seat 26 and an aligned opening in the wall 28 is a bolt 29, which bolt, at its upper end, is provided with a head 30 which forms a stop for the spring seat to limit upward movement of the seat relative to the wall 28. Exteriorly of the pocket 25 there is screwed on the lower screw threaded end of the bolt an adjusting nut 31 which is adapted for engagement by the wall 28 to limit upward movement of the bolt. Also screw threaded on this portion of the bolt is a check nut 32 which is adapted to lock the nut 31 in its proper adjusted position on the bolt.

It will here be understood that the spring 27 is of considerably less value than the truck supporting spring 8, so that it may be compressed without compressing the spring 8. The spring 27 is, however, of such value that when the brakes are released it will support the member 16 and thereby the brake rigging in the positions in which these parts are shown in Fig. 2.

The head of the bolt is square in cross-section and extends through a correspondingly shaped opening in the lug 24, there being a slight operating clearance between the head and the lug.

Interposed between and operatively engaging the lug 24 and the upper wall 33 of the pocket 25 is a spring 34 which is adapted to oppose undue upward movement of the members 16 relative to the truck frame when the brake rigging is in release position and the truck is subjected to the usual service shocks.

The brake shoe 13 is operatively connected to a vertically disposed brake cylinder lever 35 by means of a pin 36 which is mounted in the lower end of laterally spaced brake hangers 37. The upper end of each hanger 37 fits between one of the side pieces 18 of the member 16 and a lug 38 formed integral with the side piece and is rockably mounted on a short transversely extending pin 39 which is mounted in the side piece 17 and lug 38, as shown in detail in Fig. 3 the hangers serving to support the brake cylinder lever and brake shoe from the member 16.

The upper end of the brake cylinder lever 35 extends between the side pieces 17 of the member 16 and is operatively connected to the outer end of the push rod 40 of the brake cylinder, which push rod may be operatively associated in the usual manner with the hollow brake cylinder piston rod 41.

The brake shoe 14 is operatively connected to a vertically disposed lever 42 by means of a pin 43 which is mounted in the lower end of laterally spaced hangers 44, which hangers are rockably connected by pins 39 to the member 16 in the same manner as the hangers 37 for the brake cylinder lever 35.

Below the brake shoes 13 and 14 the lower ends of the levers 35 and 42 are operatively connected together by means of a longitudinally extending connecting rod 45 which passes under the brake drum.

The upper end of the lever 42 extends between the side pieces 17 of the member 16 and is fulcrumed to the outer laterally spaced ends 46 of a longitudinally extending link 47, which link, intermediate its ends, is operatively connected to the inner end of a horizontally disposed slack adjusting lever 48 which extends through an opening 49 in one of the side pieces 17 and which is pivotally connected, intermediate its ends, to the truck frame by means of a vertically disposed pin 50. The outer end of the lever 48 is operatively connected to the longitudinally movable cross-head 51 of a slack adjuster 52 secured to the outer face of the vertically disposed portion of the truck side frame, the side frame being provided with an opening 53 to accommodate the lever.

Located between and extending parallel with the side pieces 17 of the member 16 are spaced links 54 which, at their inner ends, are pivotally connected to the side pieces by means of transversely extending pins 55, each of which pins is mounted in a side piece and a spaced lug 56 which is preferably formed integral with the side piece. At their outer ends these links are connected together and to the brake shoe 15 by means of a transversely extending pin 57. This pin passes through aligned openings in the links and in two spaced lugs 58 extending outwardly from the back of the brake shoe 15, and intermediate such lugs there is mounted on the pin a roller 59.

Located centrally between the side pieces 17 and extending longitudinally of the member 16 is an adjusting member 60 preferably wedge shaped having a lower sloping or wedge surface 61 which is adapted to constantly engage the top of the roller 59 and having a straight plain upper surface 62 which is adapted to constantly engage the lower end of a lug 63 formed integral with and depending from the web 21 of the member 16. This adjusting member passes between the spaced lugs 58 on the brake shoe and, as will hereinafter more fully appear, is movable longitudinally relative to the member 16 and brake shoe 15, and since, as shown, the lugs 58 extend outwardly beyond the periphery of the roller 59 they constitute guides for the member. It will here be understood that since the member 60 is at all times in contact with the roller 59 and lug 63 this member constitutes a strut or solid connection between the member 16 and brake shoe through which braking forces applied to the member 16 will be directly transmitted to the brake shoe 15.

As shown the small end of the member 60 is in engagement with the roller 59 and lug 63 while the opposite or large end is pivotally connected by means of a pin 64 to laterally spaced inner arms 65 of the link 47, which link as hereinbefore described is operatively connected with the levers 42 and 48.

Each arm 54, intermediate its ends and at its lower edge, is provided with a circular spring seat 66 which rests on the upper end of a spring 67 which has its lower end resting on a seat 68 preferably formed integral with the adjacent side piece 17 of the member 16. These springs 67 act at all times to exert upward pressure on the arms 54 and are of sufficient strength to normally maintain the arms and the attached brake shoe 15, pin 57 and roller 59 in their proper release positions against accidental movement toward the brake drum 12. With these parts thus maintained in position, the roller 59 will maintain the adjusting member 60 in engagement with the lug 63 of the member 16. From this it will be seen that the springs 67 act to maintain a direct force transmitting connection between the member 16 and the brake shoe 15.

The slack adjuster 52 may be of the usual automatic type which is controlled by fluid under pressure which flows from the brake cylinder when, due to wear of the brake shoes and other parts of the rigging, the brake cylinder piston travels outwardly beyond a predetermined point. This type of slack adjuster is so well known by those skilled in the art that it is shown in the drawings in more or less outline form, only those details which are directly associated with the adjusting lever 48 being shown.

Briefly described the slack adjuster comprises a casing which is located at the outer side of the truck side frame and which is secured to a vertically disposed portion thereof. The cross-head 51 is movably mounted in the casing and is actuated by a screw threaded member 70 which is adapted to be advanced or retracted by means of a rotatable nut operable manually by means of a wrench or other suitable tool applied to an exterior portion 71 thereof, or which is automatically retracted to take-up slack by the usual fluid pressure responsive mechanism 72 which is controlled by the brake cylinder piston in the manner hereinafter more fully described.

Application of the brakes

When it is desired to effect an application of the brakes, fluid under pressure is admitted in the usual manner to the brake cylinder 22. In response to the pressure of fluid thus admitted, the brake cylinder functions to actuate the brake cylinder lever 35 and thereby the lever 42 to cause the brake shoes 13 and 14 to frictionally engage the peripheral braking surface of the brake drum 12.

With the brake shoes 13 and 14 thus engaging the brake drum, the increasing force of the brake cylinder on the shoes causes the shoes to move downwardly along the peripheral surface of the drums, the downwardly directed force due to such action being transmitted through the pins 36 and 43 and hangers 37 and 44 to the member 16, causing the member to move downwardly about the pin 19 and against the opposing action of the spring 27 until such time as the brake shoe 15 engages the frictional braking surface of the brake drum 12. It will here be noted that the brake cylinder, brake cylinder lever 35, links 54, brake shoe 15, adjusting member 60, link 47, brake lever 42 and connecting rod 45 move with the brake shoes 13 and 14 and member 16. The inner end of the adjusting lever 48 will move downwardly with the link 47, but there will be sufficient operating clearance provided between the lever and the pin 50 and in the connection between the lever and the cross-head 51 of the slack adjusters to permit corresponding movement of the lever.

At the time the brake shoe 15 engages the brake drum, downward movement of the member 16 and the several parts of the rigging associated therewith will stop and the member will be supported by both the truck frame and the brake drum.

It will be seen that with the brake rigging in application position, the brake shoe 15, besides serving to assist in supporting the member 16 and thereby the brake rigging also acts to oppose rotary movement of the drum, thus materially increasing the braking action on the wheel and axle assembly.

Slack adjusting operation

When, due to wear of the brake shoes 13 and 14 as well as other associated parts of the brake rigging, the brake cylinder piston, in its brake applying stroke, is permitted to uncover, to the pressure side of the piston, a port which is connected to a conduit 75 leading to the fluid pressure responsive mechanism 72 of the slack adjuster, fluid under pressure flows from the brake cylinder through the conduit to the mechanism, causing the mechanism to be conditioned for operation to effect the adjustment of the rigging upon the subsequent venting of fluid under pressure from the brake cylinder in effecting release of the brakes.

When, in releasing the brakes, the brake cylinder piston moves past the port through which fluid has been admitted to the conduit 75, such port will be connected to the non-pressure side of the piston which is in communication with the atmosphere, so that fluid under pressure is vented from the mechanism 72. This permits the mechanism to operate to rotate the adjusting nut of the slack adjuster the usual limited distance. The nut as it is thus rotated causes the threaded members 70 and thereby the cross-head 51 and outer end of the adjusting lever 48 to move in the direction toward the right hand causing the inner end of the lever, link 47, member 60 and upper end of the lever 42 to move in the opposite direction relative to the member 16. The lever 42 as it is thus moved advances the brake shoe 14 toward the braking surface of the brake drum 12 and, through the medium of the connecting rod 45, causes the brake cylinder lever to move in the direction toward the left hand thereby advancing the brake shoe 13 toward the drum. The member 60 as it is thus moved acts to force the roller 59 and thereby the pin 57, inner ends of the links 54 and brake shoe 15 downwardly relative to the member 16 against the opposing pressure of the springs 67 carried by the member 16.

From the above description it will be seen that as the brake shoes 13, 14 and 15 wear away the slack adjusting means will function automatically to position the shoes relative to the brake drum 12 to compensate for such wear. It should here be mentioned that when a brake application is effected the brake shoes 13 and 14 will each be applied to the brake drum with greater force than will the brake shoe 15, consequently the wear of the brake shoe 15 will be less than that of the other shoes and therefore the degree of adjustment for the shoe 15 should be less than that for the shoes 13 and 14. To take care of this difference the slope of the surface 61 of the member 60 is made such as to provide the proper adjustment of the shoe 15.

If, after considerable wear has occurred in the brake shoes 13 and 14, and the shoes are still suitable for use, it is desired to reposition the lever 42 so as to again approximate its original position, the lower end of the lever and the adjacent end of the connecting rod 46 are disconnected by the removal of the connecting pin 76, and the member 60 and link 47 are disconnected by the removal of pin 64. The adjusting nut 71 of the slack adjuster is now rotated manually to cause the cross-head 51 and thereby the outer end of the lever 48 to be advanced in substantially their original positions, and as a result the inner end of the lever 48 and thereby the link 47 and upper end of the lever 42 assume substantially their original positions, i. e., the positions in which they are shown in Figs. 1 and 2. After the upper end of the lever 42 has thus been positioned, the lower end thereof is moved so that the connecting pin receiving openings in the lever register with an extra pin receiving opening 77 in the adjacent end of the connecting rod 46. When the openings are in registration the connecting pin is inserted thus again connecting the lever and rod.

It will here be noted that the member 60 has not been moved from its adjusted position and that extra aligned openings 78 in the inner spaced ends 65 of the link 47 will now register with the pin receiving opening in the member. The pin 64 is now inserted in these openings thus again connecting the member and link.

With the brake rigging thus adjusted further adjustments will be made by the automatic operation of the slack adjuster 52.

*Description of the apparatus shown in Fig. 7*

The apparatus shown in Fig. 7 is quite similar to that shown in Figs. 1 to 6 inclusive, the main difference being that in the apparatus of Fig. 7 the brake cylinder 22 instead of being secured to the side pieces 17 of the member 16, is arranged between such pieces and secured to the upper side of the transom 11 of the truck frame. Another difference is that the links 54 which carry the brake shoe 15 are secured to the member 16 to the right of the vertical center line of the wheel and axle assembly instead of to the left as shown in Fig. 4.

A further difference resides in locating the member 60 and link 47 above the member 16 to facilitate inspection or removal and replacement of these parts, and also differs in that the upper plane surface 62 of the member engages with a corresponding plane surface of the member 16 instead of a lug 63 as shown in Figs. 4 and 5.

Aside from the differences just mentioned the only other differences are merely minor details of construction which have no patentable significance over the apparatus shown in Figs. 1 to 6 inclusive.

*Description of the apparatus shown in Fig. 8*

In Fig. 8 another form of the apparatus is shown which differs from the apparatus shown in Fig. 7 in that the brake cylinder 22 is secured to the transom 11 of the truck frame at a point to the rear of the pin 19 by which the member 16 is pivotally connected to the truck frame, and in that such pin is located below the brake cylinder.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said braking means with the assembly, braking means movable by said supporting means into braking engagement with the assembly, and means operative automatically to simultaneously adjust both of said braking means with relation to the assembly to compensate for wear.

2. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said braking means with the assembly, braking means movable by said supporting means into braking engagement with said assembly, and slack adjusting means associated with said truck side frame and with both of said braking means for simultaneously adjusting the braking means with relation to the assembly to compensate for wear.

3. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said brake means with the assembly, braking means movable by said supporting means into braking engagement with the assembly, means operative to simultaneously adjust both of said braking means relative to the assembly to compensate for wear, and means for actuating the adjusting means.

4. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said braking means with the assembly, braking means movable by said supporting means into braking engagement with the assembly, means operative to simultaneously adjust both of said braking means relative to the assembly to compensate for wear, and means for actuating the adjusting means, said adjusting means comprising a member operative for adjusting the first mentioned brake means, and also comprising means operative by said member for adjusting the second mentioned braking means.

5. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said braking means with the assembly, braking means movable by said supporting means into braking engagement with the assembly, means operative to simultaneously adjust both of said braking means relative to the assembly to compensate for wear, said adjusting means comprising a member operative for adjusting the first mentioned braking means and also comprising means operative by said member for adjusting the second mentioned braking means, and means for actuating said members.

6. The combination with a railway vehicle truck comprising a truck frame and a truck frame supporting wheel and axle assembly, of braking means movable into braking engagement with the said assembly, supporting means carried by said truck frame adapted to support said braking means, said supporting means being pivotally connected to the truck frame and being movable toward said assembly under the influence of forces set up by the engagement of said braking means with the assembly, braking means movable by said supporting means into braking engagement with the assembly, means operative to simultaneously adjust both of said braking means relative to the assembly to compensate for wear, said adjusting means comprising a member operative for adjusting the first mentioned braking means and also comprising wedge means operative by said member for adjusting the second mentioned braking means, and means for actuating said member.

7. The combination with a railway vehicle truck comprising a truck frame and a truck frame supporting wheel and axle assembly, of braking means movable into braking engagement with said assembly, supporting means carried by said truck frame and adapted to support said braking means, said supporting means being pivotally connected to the truck frame and being movable toward said assembly under the influence of forces set up by the engagement of said braking means with the assembly, braking means movable by said supporting means into braking engagement with the assembly, means operative to simultaneously adjust both of said braking means relative to the assembly to compensate for wear, said adjusting means comprising a member operative for adjusting the first mentioned braking means and also comprising means interposed between and engaging said supporting means and second mentioned braking means operative by said member for adjusting the second mentioned braking means, and means for actuating said members.

8. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by engagement of said braking means with the assembly, braking means movable by said supporting means into braking engagement with the assembly, means operative to simultaneously adjust both of said braking means relative to the assembly to compensate for wear, said adjusting means comprising a member operative for adjusting the first mentioned braking means and also comprising means interposed between and engaging said supporting means and second mentioned braking means constituting a strut through which braking force applied to said supporting means are transmitted to the second mentioned braking means and operative by said member for adjusting the second mentioned braking means, and means for actuating said member.

9. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said braking means to the assembly, a brake element for braking engagement with said assembly, said element being adjustably connected to said supporting means, a member interposed between said supporting means and brake element operative to adjust the position of the braking element relative to the supporting means to compensate for wear, said member constituting a strut through which braking force applied to said supporting means is transmitted to said brake element, and means operative to actuate said means and to adjust the first mentioned braking means to compensate for wear.

10. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said braking means with the assembly, a brake element movable by said supporting means into braking engagement with said assembly, said element being adjustable relative to said assembly and supporting means to compensate for wear, and means for actuating said element.

11. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said braking means with the assembly, a brake element for braking engagement with said assembly, a link pivotally connected with said element and supporting means to permit adjustment of said element relative to the supporting means, strut means interposed between said element and supporting means through which braking forces applied to the supporting means are transmitted to said element, said strut means being operable to move said element relative to said supporting means and assembly to compensate for wear, and means for actuating said strut means.

12. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable toward said assembly under the influence of forces set up by the engagement of said braking means with the assembly, a brake element for braking engagement with said assembly, a link pivotally connected with said element and supporting means to permit adjustment of said element relative to the supporting means, strut means interposed between said element and supporting means through which braking forces applied to the supporting means are transmitted to said element, said strut means being operable to move said element relative to said support means and assembly to compensate for wear, yieldable means for maintaining said element in engagement with said strut means, and means for actuating said strut means.

13. The combination with a railway vehicle truck comprising a truck frame and a truck frame supporting wheel and axle assembly, of breaking means movable into braking engagement with said assembly, supporting means carried by said truck frame adapted to support said braking means, said supporting means being pivotally connected to the truck frame and being movable toward said assembly under the influence of forces set up by the engagement of said braking means with the assembly, a brake element for braking engagement with said assembly, a link pivotally connected with said element and supporting means to permit adjustment of said element relative to the supporting means, strut means interposed between said element and supporting means through which braking forces applied to the supporting means are transmitted to said element, said strut means being operable to move said element relative to said supporting means and assembly to compensate for wear, spring means interposed between and engaging said supporting means and link for maintaining said element in engagement with said strut means, and means for actuating said strut means.

14. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable towards said assembly under the influence of forces set up by the engagement of said braking means with the assembly, braking means movable by said supporting means into braking engagement with said assembly, and slack adjusting means operative to adjust both of said braking means relative to the assembly to compensate for wear, said slack adjusting means comprising a slack adjuster carried by said truck frame, a lever pivotally connected to the truck frame and operative by said slack adjuster to adjust the first mentioned braking means, and means carried by said supporting means and operative by said lever for adjusting the second mentioned braking means.

15. The combination with a railway vehicle truck comprising a truck frame and a truck frame supporting wheel and axle assembly, of braking means movable into braking engagement with said assembly, supporting means carried by said truck frame adapted to support said braking means, said supporting means being pivotally connected to the truck frame and being movable towards said assembly under the influence of forces set up by the engagement of said braking means with the assembly, braking means movable by said supporting means into braking engagement with the assembly, and slack adjusting means operative to adjust both of said braking means relative to the assembly to compensate for wear, said slack adjusting means comprising a slack adjuster carried by said truck frame, slack take up means movable longitudinally of said supporting means for adjusting the second mentioned braking means, and a lever operative by said slack adjuster for actuating said slack take up means and for adjusting the first mentioned braking means.

16. The combination with a vehicle truck comprising a truck frame and a truck frame supporting wheel and axle assembly, of a brake mechanism for said assembly, a combined brake and support element for engagement with the assembly, means normally supporting said mechanism from said truck frame and being operable by said mechanism in effecting an application of the brakes to move said element into supporting engagement with said assembly for limiting downward movement of the brake mechanism relative to the assembly, means operative to adjust the brake mechanism to compensate for wear, and means operative by the brake mechanism adjusting means for adjusting said element to compensate for wear.

17. The combination with a vehicle truck comprising a truck frame and a truck frame supporting wheel and axle assembly, of a brake mechanism for said assembly, a combined brake and support element for engagement with the assembly, means normally supporting said mechanism from said truck frame and being operable by said mechanism in effecting an application of the brakes to move said element into supporting engagement with said assembly for limiting downward movement of the brake mechanism relative to the assembly, means operative to adjust the brake mechanism to compensate for wear, and means cooperating with the brake supporting means and said element to form a strut between the supporting means and element and operative by the brake mechanism adjusting means for adjusting the element to compensate for wear.

18. The combination with a vehicle truck comprising a truck frame and a truck frame supporting wheel and axle assembly, of a brake mechanism for said assembly, a combined brake and support element for engagement with the assembly, means normally supporting said mechanism from said truck frame and being operable by said mechanism in effecting an application of the brakes to move said element into supporting engagement with said assembly for limiting downward movement of the brake mechanism relative to the assembly, means operative to adjust the brake mechanism to compensate for wear, and wedge means interposed between the brake supporting means and the element movable longitudinally of the brake supporting means for adjusting the element to compensate for wear.

19. The combination with a vehicle truck comprising a truck frame and a truck frame supporting wheel and axle assembly, of a brake mechanism for said assembly, a combined brake and support element for engagement with the assembly, means normally supporting said mechanism from said truck frame and being operable by said mechanism in effecting an application of the brakes to move said element into supporting engagement with said assembly for limiting downward movement of the brake mechanism relative to the assembly, means operative to adjust the brake mechanism to compensate for wear, means cooperating with said brake supporting means and said element to form a strut between the supporting means and element and operative by the brake mechanism adjusting means for adjusting the element to compensate for wear, and yieldable means acting at all times to maintain said element in cooperative relationship with the adjusting means and the adjusting means in cooperative relationship with said brake supporting means.

20. The combination with a railway truck comprising a truck frame and a truck frame supporting wheel and axle assembly, of a brake shoe movable into braking engagement with said assembly, mechanism for actuating said shoe, another brake shoe movable into braking engagement with said assembly, means carried by said truck frame and supporting said mechanism, said means being movable relative to the truck frame in response to the force set up by the engagement of the first mentioned brake shoe with the assembly to cause the second mentioned shoe to engage said assembly, slack adjusting means operative to adjust said mechanism to compensate for wear, and slack adjusting means operative by the first mentioned slack adjusting means to adjust the second mentioned brake shoe to compensate for wear.

21. The combination with a railway truck comprising a truck frame and a truck frame supporting wheel and axle assembly, of a brake shoe movable into braking engagement with said assembly, mechanism for actuating said shoe, another brake shoe movable into braking engagement with said assembly, means carried by said truck frame and supporting said mechanism, said means being movable relative to the truck frame in response to the forces set up by the engagement of the first mentioned brake shoe with the assembly to cause the second mentioned shoe to engage said assembly, slack adjusting means operative to adjust said mechanism to compensate for wear, and slack adjusting means operative by the first mentioned slack adjusting means to adjust the second mentioned brake shoe relative to said means and assembly to compensate for wear.

22. The combination with a railway truck comprising a truck frame and a truck frame supporting wheel and axle assembly, of a brake shoe movable into braking enagement with said assembly, mechanism for actuating said shoe, another brake shoe movable into braking engagement with said assembly, means carried by said truck frame and supporting said mechanism, said means being movable relative to the truck frame in response to the force set up by the engagement of the first mentioned brake shoe with the assembly to cause the second mentioned shoe to engage said assembly, slack adjusting means operative to adjust said mechanism to compensate for wear, and wedge means movable by the first mentioned slack adjusting means and cooperating with the brake supporting means and second mentioned brake shoe to adjust the second mentioned brake shoe to compensate for wear.

23. The combination with a railway vehicle truck comprising a truck frame and a truck frame supporting wheel and axle assembly, of a brake shoe for braking engagement with said assembly, another brake shoe for braking engagement with said assembly, brake rigging operative to move the first mentioned brake shoe into braking engagement with said assembly, a supporting structure having at one end spaced arms pivotally connected to the truck frame for movement relative thereto, said supporting structure supporting said brake rigging and being responsive to the forces set up by the engagement of the first mentioned brake shoe with the assembly for causing the second mentioned brake shoe to engage said assembly, and means located between and secured to the arms of said supporting structure operative for actuating said brake rigging.

24. The combination with a railway vehicle truck comprising a truck frame and a truck frame supporting wheel and axle assembly, of a brake shoe for braking engagement with said assembly, another brake shoe for braking engagement with said assembly, brake rigging operative to move the first mentioned brake shoe into braking engagement with said assembly, a supporting structure having at one end spaced arms pivotally connected to the truck frame for movement relative thereto, said supporting structure supporting said brake rigging and being responsive to the forces set up by the engagement of the first mentioned brake shoe with the assembly for causing the second mentioned brake shoe to engage said assembly, means located between the arms of said supporting structure operative for actuating said brake rigging, means for adjusting said brake shoes to compensate for wear, and fluid pressure responsive means controlled by said brake cylinder for actuating said means.

25. The combination with a railway vehicle truck comprising a truck frame and a truck frame supporting wheel and axle assembly, of a brake shoe for braking engagement with said assembly, another brake shoe for braking engagement with said assembly, brake rigging operative to move the first mentioned brake shoe into braking engagement with said assembly, a supporting structure having at one end spaced arms pivotally connected to the truck frame for movement relative thereto, said supporting structure supporting said brake rigging and being responsive to the forces set up by the engagement of the first mentioned brake shoe with the assembly for causing the second mentioned brake shoe to engage said assembly, means located between the arms of said supporting structure operative for actuating said brake rigging, a lever pivotally connected to the truck frame and operative to adjust the first mentioned brake shoe to compensate for wear, means operative by said lever to adjust the second mentioned brake shoe to compensate for wear, and fluid pressure responsive means carried by said truck frame and controlled by said brake cylinder for actuating said lever.

26. The combination with a railway vehicle truck comprising a truck frame and a truck frame supporting wheel and axle assembly, of a brake shoe for braking engagement with said assembly, another brake shoe for braking engagement with said assembly, brake rigging operative to move the first mentioned brake shoe into braking engagement with said assembly, a supporting structure having at one end spaced arms pivotally connected to the truck frame for movement relative thereto, said supporting structure supporting said brake rigging and being responsive to the forces set up by the engagement of the first mentioned brake shoe with the assembly for causing the second mentioned brake shoe to engage said assembly, and means located between the arms of said supporting structure operative for actuating said brake rigging, a member operative to adjust the second mentioned brake shoe to compensate for wear, means operative to actuate said member and to adjust the first mentioned brake shoe to compensate for wear, and fluid pressure responsive means controlled by the brake cylinder for actuating said means.

27. The combination with a railway vehicle truck comprising a truck frame and a truck frame supporting wheel and axle assembly, of a braking element carried by said truck frame and adapted to be moved vertically relative to the truck frame into and out of frictional braking engagement with said wheel and axle assembly, means operative to effect the vertical movement of said braking element, and means operative automatically for regulating the vertical travel of said braking element in its movement out of its braking engagement with the wheel and axle assembly to a fixed distance from the assembly to compensate for wear of the braking element.

28. The combination with a railway vehicle truck comprising a truck frame and a truck frame supporting wheel and axle assembly, of a braking element carried by said truck frame and adapted to be moved vertically relative to the truck frame into and out of frictional braking engagement with said wheel and axle assembly, means operative to effect the vertical movement of said braking element, and means included in the operating means operative automatically for regulating the vertical travel of said braking element in its movement out of its braking engagement with the wheel and axle assembly to a fixed distance from the assembly to compensate for wear of the braking element and the operating means.

29. The combination with a railway vehicle truck comprising a truck frame and a truck frame supporting wheel and axle assembly, of a braking element carried by said truck frame and adapted to be moved vertically relative to the truck frame into and out of frictional braking engagement with said wheel and axle assembly, means operative to effect the vertical movement of said braking element, and slack adjusting means conditioned automatically upon movement of the braking element due to wear of the braking element when in braking engagement with the wheel and axle assembly to operate automatically upon movement of the braking element out of braking engagement with said assembly to insure the braking element assuming an adjusted position a substantially fixed distance from said assembly regardless of the extent of such wear.

30. The combination with a railway vehicle truck comprising a truck frame and a truck frame supporting wheel and axle assembly having a braking surface rotatable therewith, of braking means comprising at least three brake elements arranged in clasp arrangement about said assembly and movable into and out of braking engagement with said surface, means operative to control the operation of said brake elements, and slack adjusting means conditioned automatically upon movement of one or more of the braking elements due to wear of the element or elements when in braking engagement with said braking surface to operate automatically upon movement of the braking elements out of braking engagement with said braking surface to insure each of said braking elements assuming an adjusted position a substantially fixed distance from said braking surface regardless of the extent of such wear.

31. The combination with a railway vehicle truck comprising a truck frame and a truck frame supporting wheel and axle assembly having a braking surface rotatable therewith, of braking means comprising a pair of clasp arranged brake elements located at opposite sides of said surface and a third brake element arranged above said surface on the vertical center line of the wheel and axle assembly, actuating means for controlling the operation of all of said elements into and out of braking engagement with said braking surface, and a slack adjuster device carried by said truck frame and connected to all of said elements and operative automatically upon movement of one or more of the elements due to wear when in braking engagement with said braking surface to operate automatically upon movement of the braking elements out of braking engagement with said braking surface to insure each of said braking elements assuming an adjusted position a substantially fixed distance from said braking surface regardless of the extent of such wear.

32. The combination with a railway vehicle truck comprising a truck frame and a truck frame supporting wheel and axle assembly having a braking surface rotatable therewith, a pair of brake elements disposed in clasp arrangement about said braking surface and movable into and out of frictional braking engagement therewith, means for actuating said brake elements, a third brake element movable by said clasp arranged brake elements into engagement with said braking surface when the clasp arranged brake elements are in engagement with the braking surface, a member movable to adjust said third brake element relative to said braking surface to compensate for wear, and means operative to actuate said member and to adjust said clasp arranged brake elements relative to said braking surface to compensate for wear.

33. The combination with a railway vehicle truck comprising a truck frame and a truck frame supporting wheel and axle assembly having a braking surface rotatable therewith, a pair of brake elements disposed in clasp arrangement about said braking surface and movable into and out of frictional braking engagement therewith, means for actuating said brake elements, a third brake element movable by said clasp arranged brake elements into engagement with said braking surface when the clasp arranged brake elements are in engagement with the braking surface, a member movable in a direction longitudinally of the truck to adjust said third brake element relative to said braking surface to compensate for wear, means operative to actuate said member and to at the same time adjust said clasp arranged brake elements relative to said braking surface to compensate for wear.

34. The combination with a railway vehicle truck comprising a truck frame and a truck frame supporting wheel and axle assembly having a braking surface rotatable therewith, a pair of brake elements disposed in clasp arrangement about said braking surface and movable into and out of frictional braking engagement therewith, means for actuating said brake elements, a third brake element movable by said clasp arranged brake elements into engagement with said braking surface when the clasp arranged brake elements are in engagement with the braking surface, a member movable in a direction longitudinally of the truck to adjust said third brake element relative to said braking surface to compensate for wear, a lever pivotally mounted on said truck frame and operative to actuate said member and to adjust said clasp arranged brake elements relative to said braking surface to compensate for wear, and means operable to actuate said lever.

35. The combination with a railway vehicle truck comprising a truck frame and a truck frame supporting wheel and axle assembly having a braking surface rotatable therewith, a pair of brake elements disposed in clasp arrangement about said braking surface and movable into and out of frictional braking engagement therewith, means for actuating said brake elements, said means comprising operatively connected dead and live levers and means for actuating the live lever and thereby the dead lever, a third element movable by said clasp arranged brake elements into engagement with said braking surface when the clasp arranged brake elements are in engagement with the braking surface, a member movable to adjust said third brake element relative to said braking surface to compensate for wear, a lever providing a fulcrum for said dead lever and operable to actuate said member and to adjust said clasp arranged brake elements relative to said braking surface to compensate for wear, and means operative to actuate the fulcrum lever.

MORTIMER B. CAMERON.